F. Jacob,
Screw Propeller.
No. 46,004.  Patented Jan. 24, 1865.
Fig: 1.
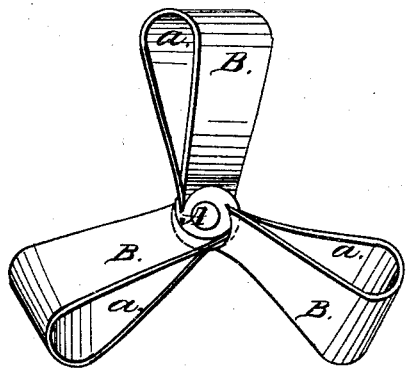
Fig: 2.
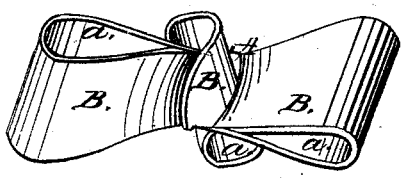
Witnesses.
Theo Tusch
Wm. F. McNamara
Inventor.
Fritz Jacob

UNITED STATES PATENT OFFICE.

FRITZ JACOB, OF NEW YORK, N. Y.

IMPROVED SCREW-PROPELLER.

Specification forming part of Letters Patent No. 46,004, dated January 24, 1865.

*To all whom it may concern:*

Be it known that I, FRITZ JACOB, of the c'ty, county, and State of New York, have invented a new and Improved Screw-Propeller; and I do hereby declare that the following is a full, clear, and exact description thereof, which will enable those skilled in the art to make and use the same, reference being had to the accompanying drawings, forming part of this specification, in which—

Figure 1 represents a front elevation of this invention. Fig. 2 is a perspective view of the same.

Similar letters of reference indicate corresponding parts.

This invention consists in a screw-propeller with hollow wings arranged in such a manner that each wing forms a channel through which the water is forced in a direction parallel to the shaft on which the screw revolves, while at the same time the faces of the wings act like the b'ades of screw-propellers of the ordinary construction, and by these means the effective surface of the screw, and consequently its propelling power, is considerably increased.

A represents the hub of my screw-propeller, to which the wings B are attached in the usual manner by casting the whole screw solid out of iron or other suitable material; or the wings may be made separate and connected to the hub in any desirable manner. Each wing is made hollow, as clearly shown in the drawings, forming a channel, *a*, through which the water is forced when the screw revolves. The faces of each wing act on the water precisely in the same manner as those of the blades of an ordinary screw-propeller, and their effect is increased by the channels *a*, which catch hold of the water and force it out in the direction of the shaft to which the screw is attached. By these channels the effective surface of each wing is considerably increased and the propelling power of my screw is far superior to that of an ordinary screw of the same dimensions. It can be cast in the same manner as an ordinary screw; its weight is the same, or not much different, and it is expected that its propelling power is from ten to twenty per cent. larger, and consequently the velocity of the screw can be reduced without reducing the speed of the vessel; or, if the velocity of the screw is not reduced, a much larger speed of the vessel can be effected.

I am aware that screw-propellers have before been made with hollow blades, and therefore do not claim this broadly; but What I do claim as new, and desire to secure by Letters Patent, is—

The screw-propeller constructed with hollow bow-ended blades B, of the form herein shown and specified, and for the object set forth.

FRITZ JACOB.

Witnesses:
   THEO. TUSCH,
   M. M. LIVINGSTON.